(12) United States Patent
Ahrendt

(10) Patent No.: US 7,248,453 B2
(45) Date of Patent: Jul. 24, 2007

(54) CIRCUIT AND METHOD FOR CONTROLLING CURRENT FLOW THROUGH A SOLENOID

(75) Inventor: Terry J. Ahrendt, Mesa, AZ (US)

(73) Assignee: Honeywell International, Inc., Morristown, NJ (US)

( * ) Notice: Subject to any disclaimer, the term of this patent is extended or adjusted under 35 U.S.C. 154(b) by 71 days.

(21) Appl. No.: 11/038,751

(22) Filed: Jan. 18, 2005

(65) Prior Publication Data

US 2005/0157444 A1 Jul. 21, 2005

Related U.S. Application Data

(62) Division of application No. 10/087,632, filed on Mar. 1, 2002, now Pat. No. 6,850,402.

(51) Int. Cl.
*H01H 9/00* (2006.01)
(52) U.S. Cl. .................. 361/154; 361/152; 361/166; 361/187
(58) Field of Classification Search ............... 361/152, 361/154, 160, 166, 187; 307/141.8; 327/396, 327/401
See application file for complete search history.

(56) References Cited

U.S. PATENT DOCUMENTS

| | | | |
|---|---|---|---|
| 4,065,096 A | 12/1977 | Frantz et al. | |
| 4,142,684 A | 3/1979 | Schweitzer | |
| 4,310,868 A | 1/1982 | Lillie et al. | |
| 4,355,619 A * | 10/1982 | Wilkinson | ............ 123/490 |
| 4,473,862 A | 9/1984 | Hill | |
| 4,631,628 A | 12/1986 | Kissel | |
| 4,890,188 A | 12/1989 | Russell et al. | |
| 5,247,419 A | 9/1993 | Grundman | |
| 5,347,419 A | 9/1994 | Caron et al. | |
| 5,381,297 A | 1/1995 | Weber | |
| 5,452,700 A | 9/1995 | Matsuura | |
| 5,461,563 A | 10/1995 | Mimura | |
| 5,647,387 A | 7/1997 | Tsutsui | |
| 5,711,280 A * | 1/1998 | Foerster et al. | ............ 123/506 |
| 5,729,422 A * | 3/1998 | Henke | ............ 361/156 |
| 5,812,355 A | 9/1998 | Nojima | |
| 5,909,199 A * | 6/1999 | Miyazaki et al. | ............ 345/60 |
| 5,915,667 A | 6/1999 | Kim et al. | |
| 6,262,620 B1 | 7/2001 | Jenski et al. | |

* cited by examiner

*Primary Examiner*—Hung V. Ngo
(74) *Attorney, Agent, or Firm*—Ingrassia Fisher & Lorenz

(57) ABSTRACT

A solenoid control circuit that includes two switching networks that are selectively opened and closed in a current limit cycle to control the magnitude of the current flowing through the solenoid. The configuration of the switching networks is such that current flows through an energy dissipating resistor only when the solenoid is commanded off by the solenoid control circuit, and not during the current limit cycle. Thus, the energy dissipated by this resistor is reduced relative to other solenoid control circuits, making it more efficient, and reducing EMI emissions from the circuit while providing for a fast solenoid response.

5 Claims, 3 Drawing Sheets

CIRCUIT AND METHOD FOR CONTROLLING CURRENT FLOW THROUGH A SOLENOID

CROSS REFERENCE TO RELATED APPLICATION

This application is a divisional of Ser. No. 10/087,632 filed on Mar. 1, 2002 now U.S. Pat No. 6,850,402.

BACKGROUND OF THE INVENTION

The present invention relates to a solenoid control circuit and, more particularly, to a circuit and method for controlling the current flow through a solenoid while simultaneously enhancing the solenoid response time.

Solenoids are used in varying industries and for various applications within these varying industries. For example, in the aerospace industry, solenoids are sometimes used in valves and actuators to move a component. As is generally known, solenoids are constructed using inductive components, which may have a relatively slow response time, from both an activation and a deactivation standpoint. Thus, no matter the particular industry and application, in some instances it may be desirable to speed up the solenoid's response time.

Two methods may be employed to speed up a solenoid's activation time. In particular, there is one way to speed up the activation response time and another way to speed up the deactivation response time. To speed up the activation response time, a relatively high solenoid activation voltage is used. Thus, when the solenoid is activated, this relatively high voltage is applied to the solenoid, which speeds up its activation response time. To speed up the deactivation time, a high power deactivation circuit, such as a low resistance, high power resistor, is used to quickly remove the stored energy from the solenoid.

If a relatively high solenoid activation voltage is used, current levels through the solenoid coil and other circuit components will be substantial. Thus, to keep the current flow to a level that does not damage the circuit components, a current limit circuit may be incorporated. This current limit circuit may be periodically switched on and off, as necessary, to limit the magnitude of the current flow. One drawback of this particular arrangement is that when the current limit circuit is activated, current may flow through the high power deactivation circuitry. Since the current limit circuit may be switched on and off at a relatively high frequency, unnecessary power dissipation may occur. Thus, large and bulky high-power components may be needed, high electromagnetic interference (EMI) emissions may occur, and the overall efficiency of the solenoid driver circuit may be reduced, while the expense and weight of the circuit may be increased.

Hence, there is a need for a solenoid driver circuit that enhances the response time of a solenoid, while addressing one or more of the above-noted drawbacks. Namely, a circuit that does not result in unnecessarily high power dissipation, and/or does not use large and bulky, high power components, and/or does not cause relatively high EMI emissions, and/or has improved efficiency. The present invention addresses one or more of these needs.

SUMMARY OF THE INVENTION

The present invention provides a solenoid control circuit and method in which two switching networks are selectively opened and closed to control the magnitude of the current flowing through the solenoid. The configuration of the switching networks is such that current flows through an energy dissipating resistor only when the solenoid is commanded off by the solenoid control circuit, and not during the current limit cycle of the control circuit. Thus, the energy dissipated by this resistor is reduced relative to other solenoid driver circuits, thereby making it more efficient and reducing EMI emissions from the circuit.

In one embodiment of the present invention, and by way of example only, a circuit for controlling current flow through a solenoid includes a first controllable switch, a second controllable switch, a diode, and a controller circuit. The first controllable switch is electrically coupled in parallel with a first resistive element. The second controllable switch is electrically coupled in series with a second resistor. The diode is electrically coupled in series between the first controllable switch and the second controllable switch. The controller circuit is operable to selectively open and close the first controllable switch and the second controllable switch in response to a command signal, and to selectively open and close the second controllable switch based on a magnitude of current flow through the solenoid.

In another exemplary embodiment, in a circuit including a series connected first controllable switch and a diode that are electrically coupled in parallel with a solenoid, and a series-connected second controllable switch and first resistive element that are electrically coupled in series with the solenoid, a method of controlling current flow through the solenoid includes closing the first and second controllable switches, whereby a current flows from a first voltage potential through the solenoid, the second controllable switch, and the first resistive element. When the current flow through the solenoid reaches a first predetermined current magnitude, the second controllable switch is opened, whereby the current flows through the solenoid, the diode, and the first controllable switch.

Other independent features and advantages of the preferred solenoid control circuit will become apparent from the following detailed description, taken in conjunction with the accompanying drawings which illustrate, by way of example, the principles of the invention.

DETAILED DESCRIPTION OF THE PREFERRED EMBODIMENT

Figure 1:
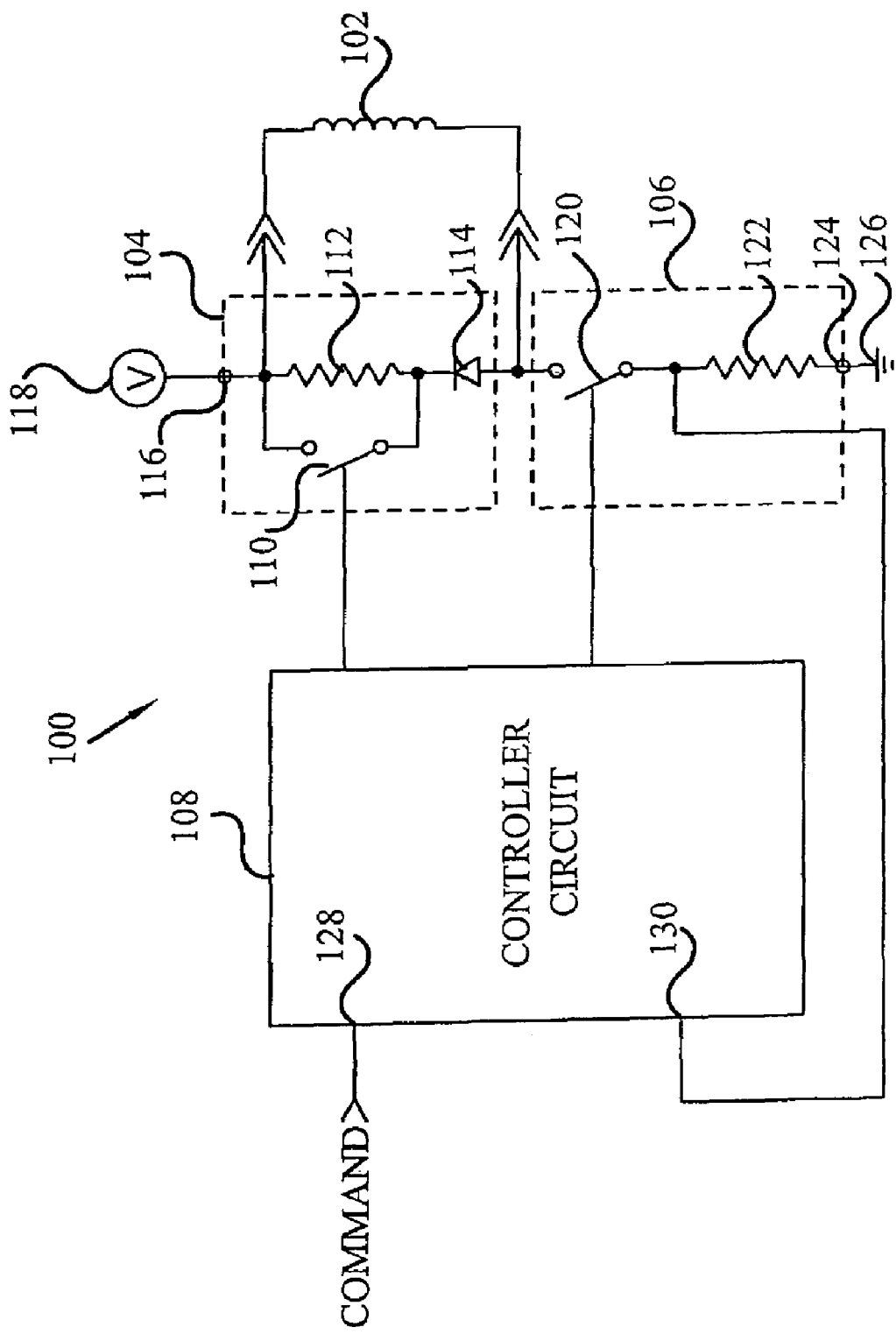
FIG. 1 is a simplified block diagram of a solenoid control circuit according to an exemplary embodiment of the present invention.

A simplified block diagram of a solenoid control circuit according to an exemplary embodiment of the present invention is depicted in FIG. 1. The solenoid control circuit 100 is used to control the current flow through one or more solenoid coils 102, and includes a first controllable switching network 104, a second controllable switching network 106, and a controller circuit 108.

The first controllable switching network 104 is electrically connected in parallel with the solenoid coils 102, and includes a first controllable switch 110, a first resistive element 112, and a diode 114. The first controllable switch 110 and first resistive element 112 are electrically connected in parallel with one another. The diode 114 is electrically connected in series with the first controllable switch 110 and first resistive element 112. In particular, in the depicted embodiment the cathode of the diode 114 is electrically connected to the first controllable switch 110 and first resistive element 112. It will be appreciated that the anode of the diode 114 could instead be electrically connected to the first controllable switch 110 and first resistive element 112, so long as the circuit operating voltages provide the correct biasing to achieve proper circuit operation. The first controllable switching network 104 is also electrically connected to a first circuit terminal 116.

When the solenoid control circuit 100 is energized and operable, the first circuit terminal 116 is used to couple the first switching network 102 to a first voltage potential 118. In the depicted embodiment, this first voltage potential 118 is a relatively high magnitude, positive (relative to reference potential) voltage potential, which is used to enhance the turn on response of the solenoid coils 102. It is to be appreciated that the first voltage potential 118 may also be a relatively high magnitude, negative voltage potential, so long as the polarity sensitive components of the solenoid control circuit 100 are appropriately connected to achieve proper circuit operation and response. Additionally, in the depicted embodiment, the first resistive element 112 is a resistor, though it will be appreciated that this element could also be a zener diode or other known resistive element.

The second controllable switching network 106 is electrically connected in series with the first controllable switching network 104 and the solenoid coils 102, and includes a second controllable switch 120 and a second resistor 122. The second controllable switching network 106 is also electrically connected to a second circuit terminal 124. Similar to the first circuit terminal 116, when the solenoid circuit 100 is energized and operable, the second circuit terminal 124 is used to couple the second switching network 106 to a second voltage potential 126. In the depicted embodiment, the second voltage potential 126 is a ground or reference potential. It will also be appreciated that the second voltage potential 126 may also be a negative potential (relative to reference potential) or a positive potential, so long as the polarity sensitive components of the solenoid control circuit 100 are appropriately connected to achieve proper circuit operation.

The controller circuit 108 includes at least two input ports, a first input port 128 and a second input port 130. The first input port 128 is used to receive a command signal for either energizing or de-energizing the solenoid coils 102. The second input port 130 is electrically connected to the second switching network 106, between the second controllable switch 120 and the second resistor 122. Thus, the second input port 130 receives a feedback signal having a voltage magnitude that is representative of the current flow through the solenoid coils 102. Based on the signals received by the first 128 and second 130 input ports, the controller circuit 108 selectively opens and closes the first 110 and second 120 controllable switches to energize, and appropriately limit current flow through, the solenoid coils 102. A more detailed description of this functionality will now be provided.

If the first input port 128 receives the appropriate command signal for energizing the solenoid coils 102, then the controller circuit 108 will cause both the first and second 120 controllable switches to close. As a result, current will flow from the first voltage potential 118, through the solenoid coils 102 and the second switching network 106, to the second voltage potential 126. Because of the way the diode 114 is connected in the first switching network 104, it is at this point reverse biased. Thus, no current will flow through the first switching network 104.

When the current flow through the solenoid coils 102 reaches a first predetermined current magnitude, as indicated by the voltage drop across the second resistor 122 reaching a first predetermined voltage magnitude, the controller circuit 108 causes the first controllable switch 110 to remain closed and causes the second controllable switch 120 to open. The current in the solenoid coils 102, due to inductive action, will now flow through the first switching network 104. Specifically, current will flow from the solenoid coils 102, through the diode 114 and first controllable switch 110, back to the solenoid coils 102. Once the current flow through the solenoid coils 102 decays to a second predetermined current magnitude, the controller circuit 108 causes the second controllable switch 120 to once again close.

The controller circuit 108 continues to operate the first 110 and second 120 controllable switches in the above-described current limit cycle until the first input port 128 receives the appropriate command signal for de-energizing the solenoid coils 102. When this occurs, the controller circuit 108 causes both the first 110 and second 120 controllable switches to open. The current in the solenoid coils 102 will now flow through the diode 114 and the first resistive element 112. The resistance and power rating of the first resistive element 112 are selected such that the energy in the solenoid coils 102 is quickly dissipated as heat.

The solenoid control circuit 100 may be implemented using various known circuit components and configurations. Having described the solenoid control circuit from a generalized block diagram aspect, a description of a particular implementation will now be described, with reference to FIG. 2, in which like reference numerals refer to like circuit portions of the circuit depicted in FIG. 1.

In the depicted implementation, the first controllable switching network 104, which is connected in parallel with the solenoid coils 102, includes the first resistive element 112, and the diode 114. The first controllable switch, however, is implemented using a first metal-oxide-semiconductor field effect transistor (MOSFET) 210. The first MOSFET 210 is, in the depicted embodiment, an N-channel MOSFET, with its source (S) electrically connected to the first circuit terminal 116, its drain (D) electrically connected between the first resistive element 112 and the diode 114, and its gate (G) coupled to receive a first signal from the controller circuit 108.

The second controllable switching network 106 includes the second resistor 122 and, as with the first controllable switching network 104, uses a second MOSFET 220 as the second controllable switch. The second MOSFET 220 is also an N-channel MOSFET, and its source (S) is electrically connected to the second resistor 122, its drain (D) is electrically connected to the diode 114, and its gate (G) is electrically connected to receive a second signal from the controller circuit 108.

It will be appreciated that either or both of the first 210 and second 220 MOSFETs could be implemented as P-channel MOSFETs, so long as the circuit operating voltages are implemented to provide the correct biasing voltage to achieve proper circuit operation. It will also be appreciated that the first and second controllable switches could be implemented as other components including, but not limited to, JFETs, IGBTs, bipolar transistors, thyristors, and SCRs.

Turning now to the controller circuit 108, it can be seen that in the depicted embodiment it includes five major circuit portions, a solenoid current monitoring circuit portion 202, a comparator circuit portion 204, an input circuit portion 206, and a driver circuit portion 208. Each of these circuit portions will now be described in more detail, beginning first with the solenoid current monitoring circuit portion 202.

The solenoid current monitoring circuit portion 202 includes an amplifier circuit 212 and a timing circuit 214. The amplifier circuit 212 has at least a first input 213 terminal, a second input terminal 215, and an output terminal 217. The first input terminal 213 is electrically connected between the second MOSFET 220 and the second resistor 122. The second input terminal 215 is electrically connected to a resistor R11, which in turn is electrically connected to a reference potential 219. The output terminal 217 is electrically connected to the timing circuit 214. A feedback resistor R15 is electrically connected between the amplifier output terminal 217 and the second input terminal 215, thereby configuring the amplifier circuit 212 as a generic non-inverting type of amplifier. It will be appreciated that the circuit resistors R11 and R15 are selected to provide the appropriate amount of gain to set the solenoid holding current level. It will be further appreciated that the amplifier circuit 212 may also be configured as an inverting amplifier circuit.

The timing circuit 214 is electrically connected to the output 217 of the amplifier circuit 212, and includes a resistor R9 and a capacitor C11. Thus, the capacitor C11 charges and discharges through resistor R9. In particular, when the second MOSFET 220 is on and current is flowing through the second resistor 122, the voltage developed across the second resistor 122 is amplified by the amplifier circuit 212 and supplied to its output terminal 217. This voltage on the output terminal 217 of the amplifier 212 charges the capacitor C11 through resistor R9. Conversely, when the second MOSFET 220 is off and no current flows through the second resistor 122, capacitor C11 is discharged through resistor R9. The reasoning for this will be more fully described further below. It is to be appreciated that the values of C11 and R9 are selected to provide the desired discharge time of capacitor C11 when the second MOSFET 220 is off, and may be any one of numerous desired values that meet the operational goals of the solenoid control circuit 100.

The comparator circuit portion 204 is electrically coupled to receive a reference voltage 205 having a predetermined reference voltage magnitude, the voltage that the capacitor C11 is charged to, which is representative of the current magnitude flowing through the solenoid coils 102, and the command signal from the input circuit portion 206. Based on these inputs, the comparator circuit supplies a switch control signal to the driver circuit portion 208. To carry out this function, the comparator circuit portion 204 includes a comparator 222 and a logical AND circuit 224. The comparator 222 has a first input terminal 223, a second input terminal 225, and an output terminal 227. The first input terminal 223 is electrically connected to the timing circuit 214 and the second input terminal 225 is electrically connected to a reference voltage terminal 226 that is coupled to receive the reference voltage 205. The comparator 222 is configured such that it supplies a logical high signal (e.g., approximately +5VDC in the depicted embodiment) whenever the capacitor C11 is charged to a voltage. magnitude that is less than or equal to a first comparator voltage magnitude, or is charging from a magnitude that is less than or equal to the first comparator voltage magnitude toward the predetermined referenced voltage magnitude. The comparator 222 supplies a logical low signal (e.g., approximately 0VDC in the depicted embodiment) whenever the capacitor C11 is charged to a voltage magnitude that is greater than or equal to the predetermined reference voltage magnitude or is discharging from a voltage magnitude that is greater than or equal to the predetermined reference voltage magnitude toward the first comparator voltage magnitude.

The logical AND circuit 224 includes a first input terminal 229, a second input terminal 231, and an output terminal 233. As is generally known, the logical AND circuit 224 supplies a logical high signal on its output terminal 233 only when logical high signals are supplied to both the first 229 and the second 231 input terminals.

The input circuit portion 206 includes two inverter circuits, a first inverter circuit 252 and a second inverter circuit 254. The first inverter circuit 252 is coupled to the first input port 128. As was previously noted, the first input port 128 is used to receive the command signal for either energizing or de-energizing the solenoid coils 102. The first inverter circuit 252 exhibits a high impedance to the circuit or component supplying the command signal, and logically inverts the command signal. In other words, if the command signal is a logical high signal, the first inverter circuit supplies a logical low signal, and vice-versa. The second inverter circuit 254, which also has a high input impedance, inverts the signal output by the first inverter 252, to supply the correct logic level signal to the driver circuit portion 206.

The driver circuit portion 208 includes one or more drivers that are used to switch the first 210 and second 220 MOSFETs on and off, in response to the command signal received from the input circuit portion 206 and the switch control signal received from the comparator circuit portion 204. In the depicted embodiment, the driver circuit portion 208 uses an integrated circuit 262 to carry out this functionality. One example of an integrated circuit that performs this function is known as an IR2110, manufactured by International Rectifier. It will be appreciated that other integrated circuits may be used to carry out this same function, or the driver circuit portion 208 could be implemented using discrete components instead of an integrated circuit.

Figure 2:
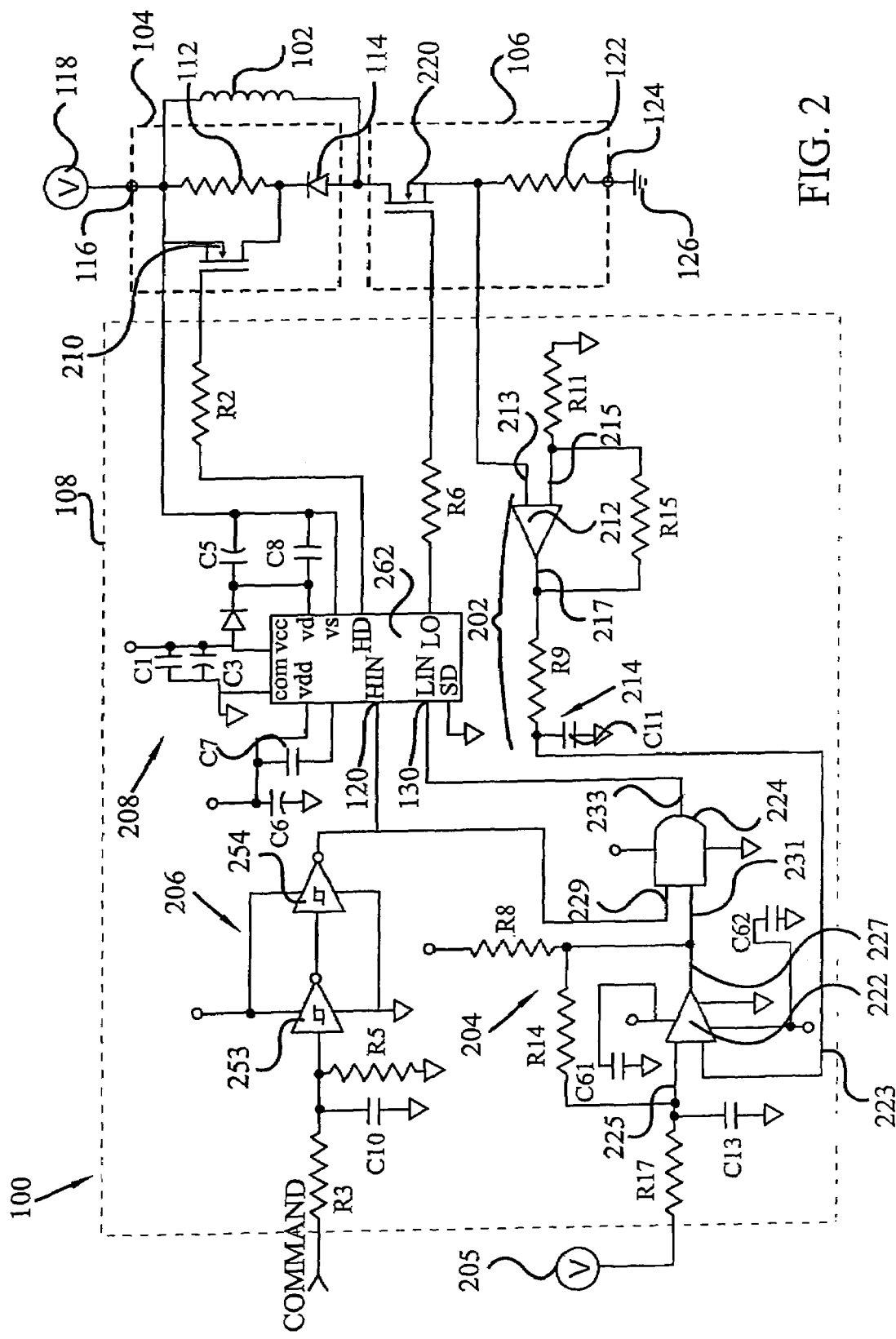
FIG. 2 is a detailed schematic diagram of a particular preferred embodiment of the present invention.
Figure 3:
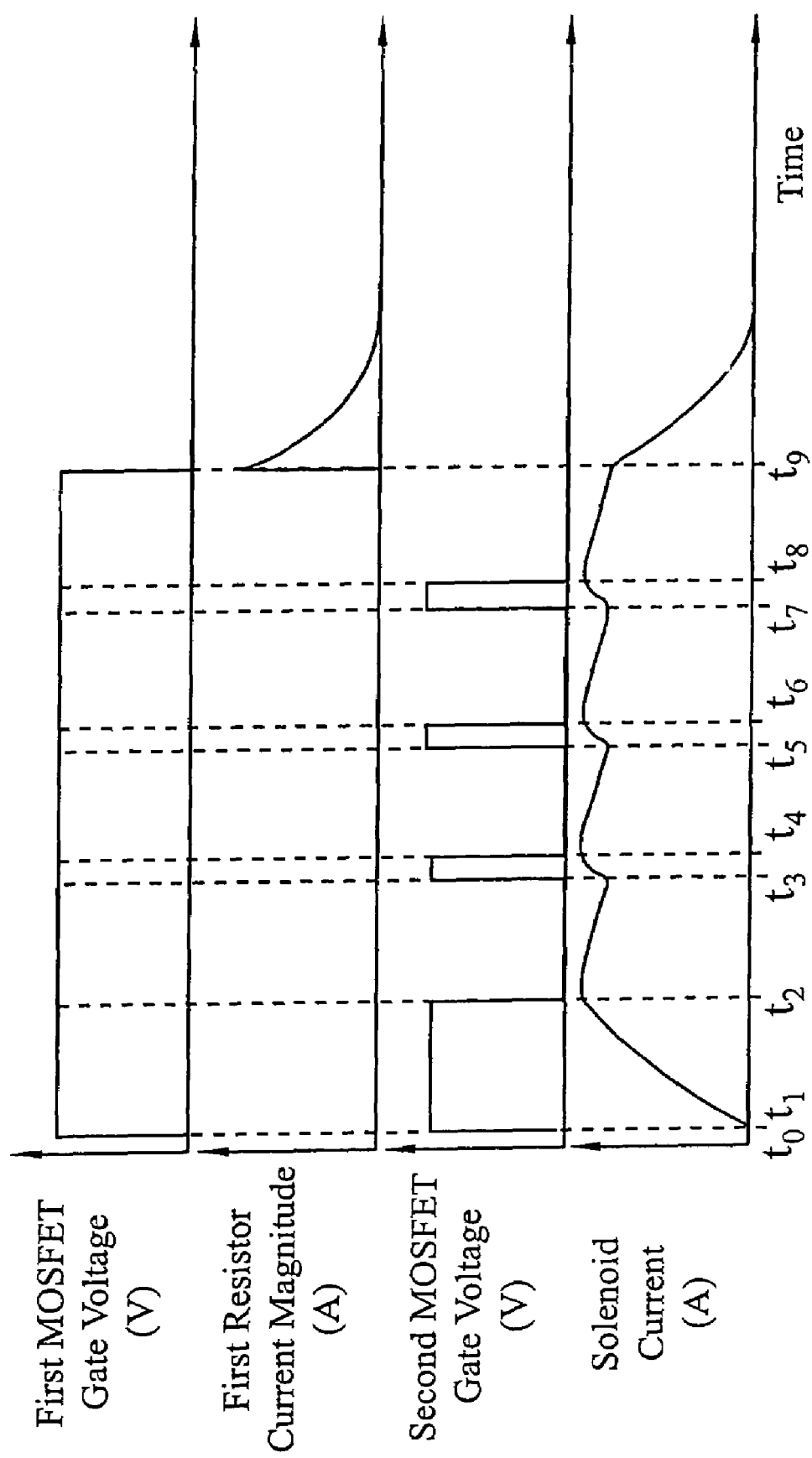
FIG. 3 depicts various waveforms associated with the circuit depicted in FIG. 2.

Having described both a general and specific embodiment of the present invention from a structural standpoint, an operational description of the solenoid control circuit 100 depicted in FIG. 2, will now be provided. In doing so, reference should be made to FIGS. 2 and 3, as necessary.

Initially, at time $t_0$, it will be assumed that the solenoid control circuit 100 is energized, and is receiving an appropriate command to de-energize the solenoid coils 102 (e.g., a logic low signal). Thus, both the first 210 and second 220 MOSFETs are off (e.g., non-conducting). At time $t_1$, the command signal goes high. As a result, the driver circuit portion 208 supplies a logic high signal to the gate of the first MOSFET 210, causing it to turn on (e.g., conduct). Substantially simultaneous with this, the command signal is supplied to the first input terminal 229 of the AND circuit 224. Because no current is yet flowing through the solenoid coils 102, there is no voltage drop across the second resistor 122, thus the output of the comparator 224, which is coupled to the second input 231 of the AND circuit 224 is a logic high. Since both inputs to the AND circuit 224 are high, its output 223 is high. As a result, the driver circuit 208 supplies a logic high signal to the gate of the second MOSFET 220, as well. This causes current to flow from the first voltage potential 118, through the solenoid coils 102, the second MOSFET 220, and the second resistor 122.

At time $t_2$, the magnitude of the current flow through the solenoid coils 102 has reached the first predetermined current magnitude. This is determined by the magnitude of the voltage drop across the second resistor 122 reaching the first predetermined voltage magnitude. As was noted above, the voltage drop across the second resistor 122 is amplified and charges capacitor C11 to the predetermined reference voltage magnitude. When this occurs, the output of the comparator 222 goes low, the output of the AND circuit 224 goes low, and the driver circuit 208 supplies a logic low signal to the gate of the second MOSFET 220, turning it off. When the second MOSFET 220 turns off, current no longer flows through the second resistor 122. Thus, the voltage drop across the second resistor falls to zero. As a result, capacitor C11 starts discharging through R9. At substantially the same time, current now flows through the solenoid coils 102, the diode 114, and the first MOSFET 210, and not the first resistive element 112.

Capacitor C11 continues to discharge until time $t_3$, when the potential across it reaches the above-noted first comparator voltage magnitude. It is noted that the values of capacitor C11 and resistor R9 are chosen such that the magnitude of the current flowing through the solenoid coils 102 has decayed to at least the second predetermined current magnitude in the time it takes for capacitor C11 to discharge from the predetermined referenced voltage magnitude to the first comparator voltage magnitude. At this time, the outputs of the comparator 222 and the AND circuit 224 once again go high, causing the driver circuit 208 to supply a logic high signal to the gate of the second MOSFET 220. Thus, the second MOSFET 220 once again conducts.

This current limiting cycle continues until time $t_9$, when the command signal goes low. As a result, the driver circuit 208 supplies a logic low signal to the gate of the first MOSFET 210, causing it to turn off. Substantially simultaneous with this, the logic low signal is supplied to the first input terminal 229 of the AND circuit 224, causing its output 227 to be low. In response, the driver circuit 208 supplies a logic low signal to the gate of the second MOSFET 220, turning it off as well. At this point, current flows through the solenoid coils 102 and the first resistive element 112. With the solenoid coil 102 current flyback path now including first resistive element 112, the energy stored in the solenoid coils 102 is quickly dissipated, which in turn speeds up the turn off time of the solenoid 102.

With the solenoid control circuit and method of the present invention, current flows through the first resistive element 112 only when the controller circuit 108 receives an appropriate command for de-energizing the solenoid coils 102, and not during the current limit cycle. Thus, the energy dissipated by the first resistive element 112 is reduced relative to other solenoid driver circuits, which makes it more efficient compared to other circuits, and EMI emissions from the circuit 100 are also reduced compared to other circuits.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. In a circuit including series connected first controllable switch and a diode that are electrically coupled in parallel with a solenoid, and a series-connected second controllable switch and first resistor that are electrically coupled in series with the solenoid, a method of controlling current flow through the solenoid, comprising:
    closing the first and second controllable switches, whereby a current flows from a first voltage potential through the solenoid, the second controllable switch, and the first resistor;
    determining when the current flow through the solenoid reaches a first predetermined current magnitude; and
    opening the second controllable switch when the first predetermined current magnitude is reached, whereby the current flows through the solenoid, the diode, and the first controllable switch.

2. The method of claim 1, further comprising:
    after opening the second controllable switch, determining when the current flow through the solenoid reaches at least a second predetermined current magnitude, that is less than the first predetermined magnitude; and
    closing the second controllable switch when the second predetermined current magnitude is reached, whereby the current flows from the first voltage potential through the solenoid, the second controllable switch, and the first resistor.

3. The method of claim 1, wherein the step of determining when the current flow through the solenoid reaches the first predetermined current magnitude comprises:
    determining when a voltage drop across the first resistor reaches a first predetermined voltage magnitude.

4. The method of claim 2, wherein the step of determining when the current flow through the solenoid reaches the second predetermined current magnitude comprises:
    determining that the second controllable switch has been opened for a predetermined time period, such that the current flow through the solenoid has decayed to at least the second predetermined current magnitude.

5. The method of claim 1, further comprising:
    opening the first and second controllable switches, whereby the current flow through the solenoid is dissipated by a second resistor that is electrically coupled in parallel with the first controllable switch.

* * * * *